United States Patent
Kim et al.

(10) Patent No.: US 8,745,991 B2
(45) Date of Patent: Jun. 10, 2014

(54) TURBINE SYSTEM

(75) Inventors: Myeong-hyo Kim, Changwon (KR);
Min-seok Ko, Changwon (KR);
Jong-sub Shin, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 943 days.

(21) Appl. No.: 12/831,768

(22) Filed: Jul. 7, 2010

(65) Prior Publication Data

US 2011/0225977 A1    Sep. 22, 2011

(30) Foreign Application Priority Data

Mar. 16, 2010    (KR) .......................... 10-2010-0023412

(51) Int. Cl.
*F02C 7/20*    (2006.01)

(52) U.S. Cl.
USPC ................... 60/796; 60/797; 60/798; 60/792; 60/39.163

(58) Field of Classification Search
USPC ........... 60/783, 792, 39.15, 39.163, 802, 793, 60/796, 797, 798, 778, 786, 788
See application file for complete search history.

(56) References Cited

U.S. PATENT DOCUMENTS

| | | | |
|---|---|---|---|
| 2,693,080 A | 11/1954 | Hutchinson | |
| 3,313,104 A * | 4/1967 | Evans et al. ................. | 60/39.163 |
| 3,358,441 A | 12/1967 | Gist | |
| 3,611,716 A | 10/1971 | Ferrari et al. | |
| 3,635,019 A | 1/1972 | Kronogard et al. | |
| 4,150,547 A * | 4/1979 | Hobson ........................... | 60/659 |
| 4,275,310 A | 6/1981 | Summers et al. | |
| 5,039,281 A * | 8/1991 | Johnston ........................ | 417/212 |
| 5,408,821 A * | 4/1995 | Romero et al. ................. | 60/778 |
| 5,448,889 A * | 9/1995 | Bronicki ..................... | 60/641.14 |
| 5,634,340 A * | 6/1997 | Grennan ......................... | 60/652 |
| 5,778,675 A * | 7/1998 | Nakhamkin .................... | 60/652 |
| 5,901,579 A | 5/1999 | Mahoney et al. | |
| 6,282,897 B1 | 9/2001 | Paul | |
| 7,409,832 B2 * | 8/2008 | Nakano et al. .................. | 60/797 |
| 8,381,617 B2 | 2/2013 | Holt et al. | |
| 2004/0006994 A1 * | 1/2004 | Walsh et al. ..................... | 60/792 |

FOREIGN PATENT DOCUMENTS

| | | |
|---|---|---|
| CN | 101395406 B | 3/2013 |
| EP | 0 672 877 A1 | 9/1995 |
| EP | 1 362 984 A2 | 11/2003 |
| FR | 2 336 553 A2 | 7/1977 |

(Continued)

OTHER PUBLICATIONS

European Search Report, dated Jul. 4, 2011, issued in Application No. 10172326.0.

(Continued)

*Primary Examiner* — Phutthiwat Wongwian
*Assistant Examiner* — Steven Sutherland
(74) *Attorney, Agent, or Firm* — Sughrue Mion, PLLC

(57) ABSTRACT

A turbine system includes a compressor unit which compresses a fluid; a combustor unit which burns fuel with the compressed fluid; a turbine unit which is driven due to a combustion gas that is generated when the combustor unit burns the fuel; and a first device which receives power that is generated when the turbine unit is driven. The at least one compressor unit operates using at least the generated power, and is separately disposed from at least one of the turbine unit and the first device.

18 Claims, 7 Drawing Sheets

(56) References Cited

FOREIGN PATENT DOCUMENTS

GB    1 204 321 A    9/1970
JP    2010-133284 A    6/2010
WO    99/49222 A1    9/1999
WO    2007/102964 A2    9/2007

OTHER PUBLICATIONS

Communication dated Jan. 24, 2014 issued by the State Intellectual Property Office of the People's Republic of China in counterpart Chinese Patent Application No. 201010246117.X.

* cited by examiner

TURBINE SYSTEM

CROSS-REFERENCE TO RELATED PATENT APPLICATION

This application claims priority from Korean Patent Application No. 10-2010-0023412, filed on Mar. 16, 2010, the disclosure of which is incorporated herein in its entirety by reference.

BACKGROUND

1. Field

Apparatuses consistent with the present inventive concept relate to a turbine system, and more particularly, to the structure of the turbine system.

2. Description of the Related Art

In general, a turbine system generates power by obtaining rotatory power as a propulsive force or a reactive force from the flow of a compressed fluid such as steam or a gas. A turbine engine or a turbine power generation system may operate by using the flow of a compressed fluid. For example, in comparison to an existing reciprocating engine, a turbine engine is much lighter, generates much higher power, and discharges less air-pollution materials, and thus is regarded as a high-power-density clean engine. A turbine engine may include a compressor for compressing air, a combustor for burning fuel mixed with the compressed air, and a turbine for driving the compressor by obtaining rotatory power from the gas rapidly expanded from high temperature and high pressure due to an explosion that occurs in the combustor, and discharging an exhaust gas. The air compressed by the compressor is provided to the combustor and the combustor burns the fuel mixed with the compressed air. As in a turbine engine, a turbine power generation system may generate electricity by driving a turbine by means of rotatory power obtained from expansion of a high-temperature high-pressure fluid that is exploded in the combustor.

SUMMARY

According to an exemplary embodiment, there is a provided turbine system including a combustor unit which burns fuel with the compressed fluid; a turbine unit which is driven due to a combustion gas that is generated when the combustor unit burns the fuel; and a first device which receives power that is generated when the turbine unit is driven, wherein the at least one compressor unit operates using at least the generated power, and is separately disposed from at least one of the turbine unit and the first device.

The at least one compressor unit may receive the generated power via gear-coupling.

The turbine system may further include a first rotational shaft mechanically coupled to the compressor unit; and a second rotational shaft mechanically coupled to the turbine unit, and the first rotational shaft and the second rotational shaft may be detachably coupled to each other.

The first rotational shaft and the second rotational shaft may be coupled to each other by the first coupling member.

A number of the at least one compressor unit may be two or more, and at least two compressor units among the at least one compressor unit may be gear-coupled to the first rotational shaft.

The first rotational shaft and the second rotational shaft may be integrally formed to be gear-coupled to the compressor unit.

At least two compressor units may be shaft-coupled to the first rotational shaft.

The at least one compressor unit may include an impeller that rotates about a third rotational shaft that is coupled to a first gear on the first rotational shaft and rotates according to a predetermined gear ratio.

At least two compressor units may be shaft-coupled to the third rotational shaft.

The turbine system may further include at least one intercooler which cools the fluid discharged from the at least one compressor unit. The compressor system may include at least two intercoolers.

The turbine system may further include a recuperator which heats the fluid of compressed fluid and/or moisture, by using at least an exhaust gas discharged from the turbine unit.

The turbine system may further include a humidifier which adds moisture to the compressed fluid by the at least one compressor unit, to provide the fluid to the recuperator.

The first device may comprise a power generator that generates electricity. In this case, an output of the power generator may not be greater than 100 MW and an efficiency of the turbine system may be about 40% to about 60%. An output of the power generator may not be greater than 50 MW and an efficiency of the turbine system may be about 40% to about 55%. An output of the power generator may not be greater than 20 MW and an efficiency of the turbine system may be about 40% to about 50%.

The turbine system may further include a first housing and a second housing that are separate from each other, the first housing may accommodate at least the at least one compressor unit, and the second housing may accommodate at least the combustor unit, the turbine unit and the first device.

The turbine system may further include at least one intercooler which cools the fluid discharged from the at least one compressor unit, and the first housing may further accommodate the at least one intercooler.

The turbine system may further include a recuperator which heats the fluid of compressed fluid and/or moisture, by using at least an exhaust gas discharged from the turbine unit, and the second housing may further accommodate the recuperator.

The turbine system may further include a humidifier which adds moisture to the compressed fluid, to provide the fluid to the recuperator, and the first housing may further accommodate the humidifier.

The turbine unit may be disposed between the first device and the at least one compressor unit.

The turbine system may further include a transmission which changes rotation speeds of an output shaft of the turbine unit and an input shaft of the first device.

At least one of the at least one compressor unit, the turbine unit, the first device and the combustor unit may be disposed on at least one base frame that is movable.

The turbine system may further include a transmission which changes rotation speeds of an output shaft of the turbine unit, an input shaft of the first device, and an input shaft of the compressor unit, and the transmission may be coupled to the compressor unit, the turbine unit and the first device via independent shafts.

According to the present inventive concept, the efficiency of a turbine system may be improved.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION EXEMPLARY EMBODIMENTS

Hereinafter, the present inventive concept will be described in detail by explaining exemplary embodiments with reference to the attached drawings.

Figure 1:
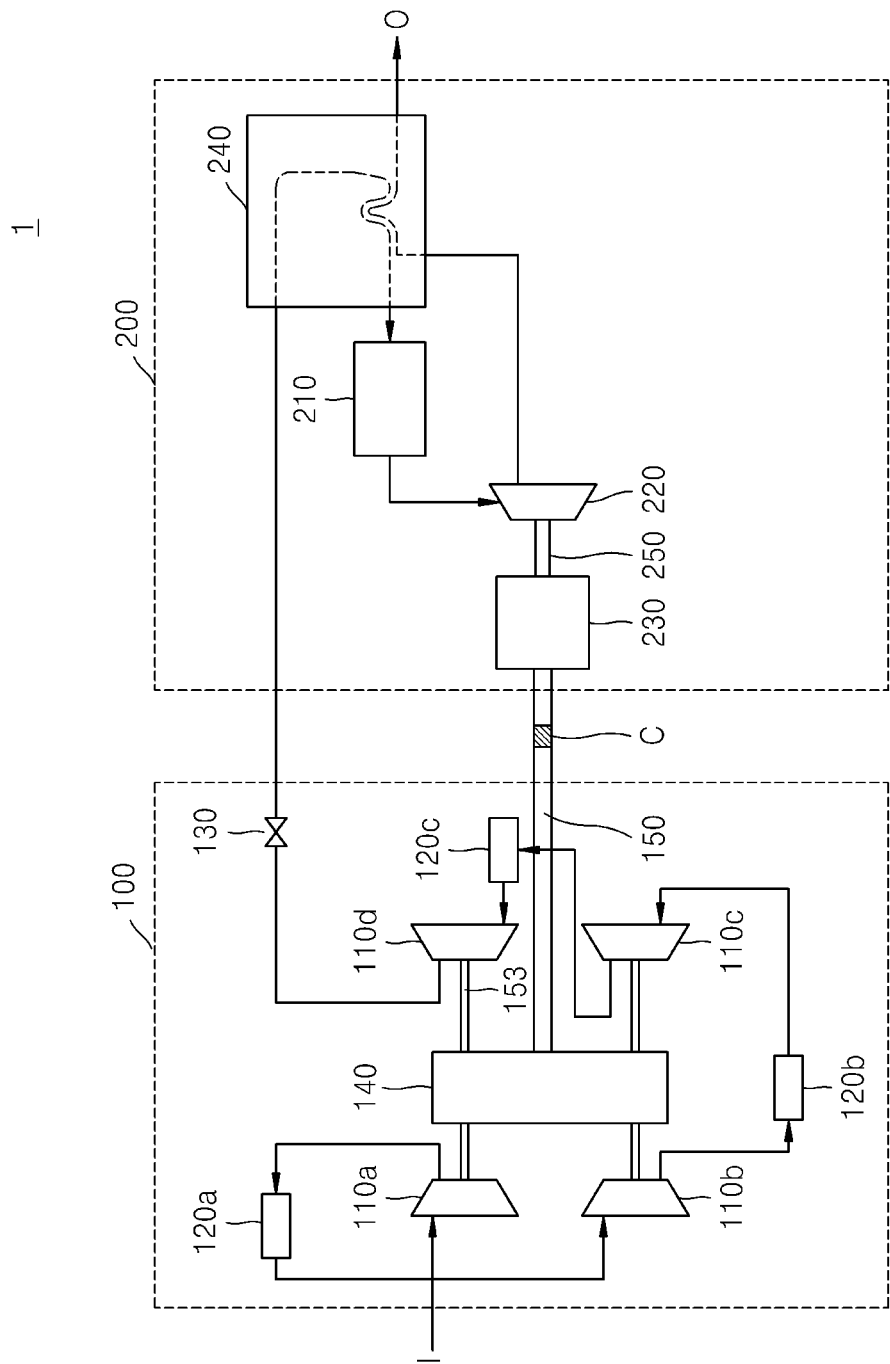
FIG. 1 is a schematic structural view of a turbine system according to an exemplary embodiment.
Figure 2:
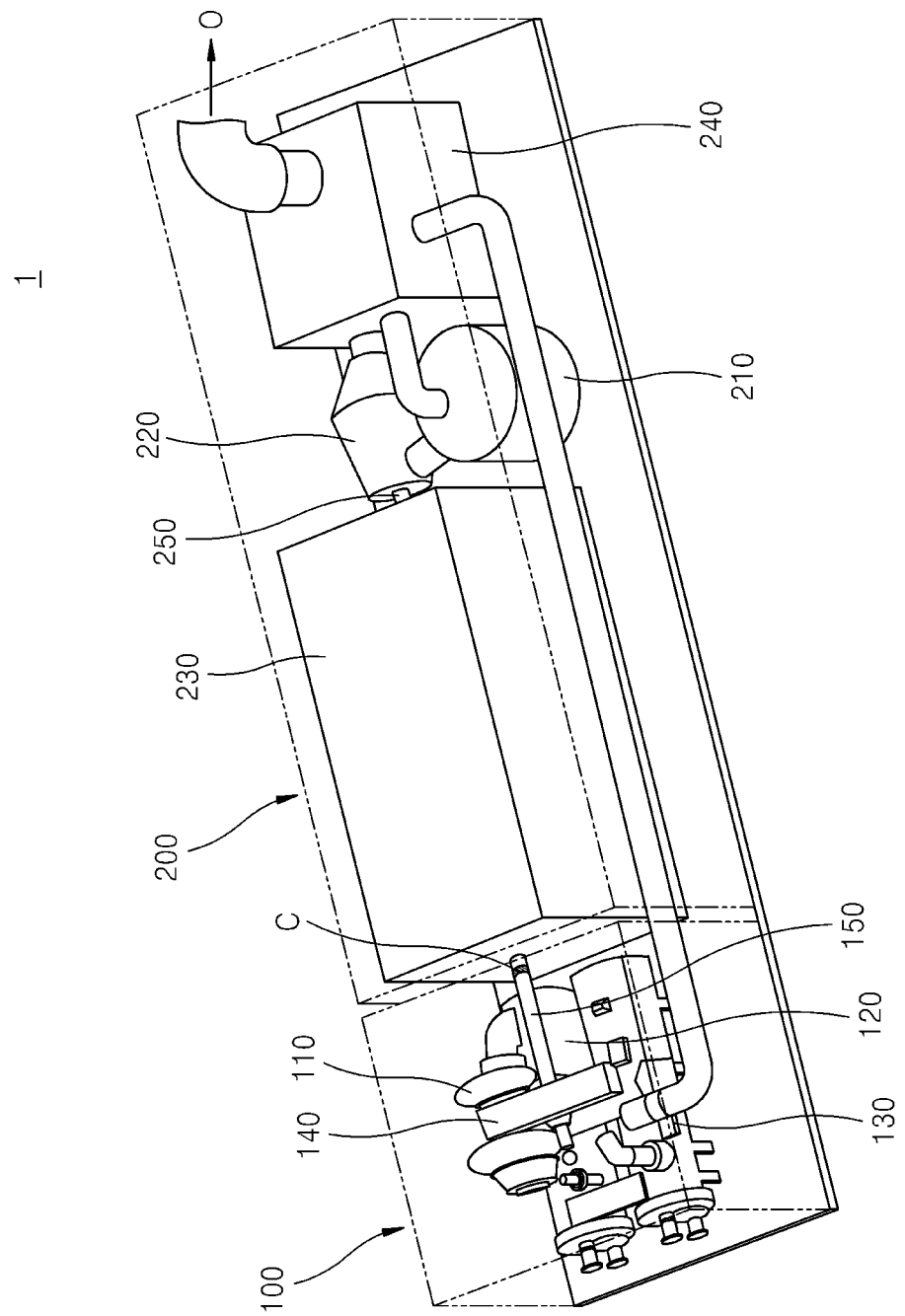
FIG. 2 is a schematic perspective view of the turbine system illustrated in FIG. 1, according to an exemplary embodiment.
Figure 3:
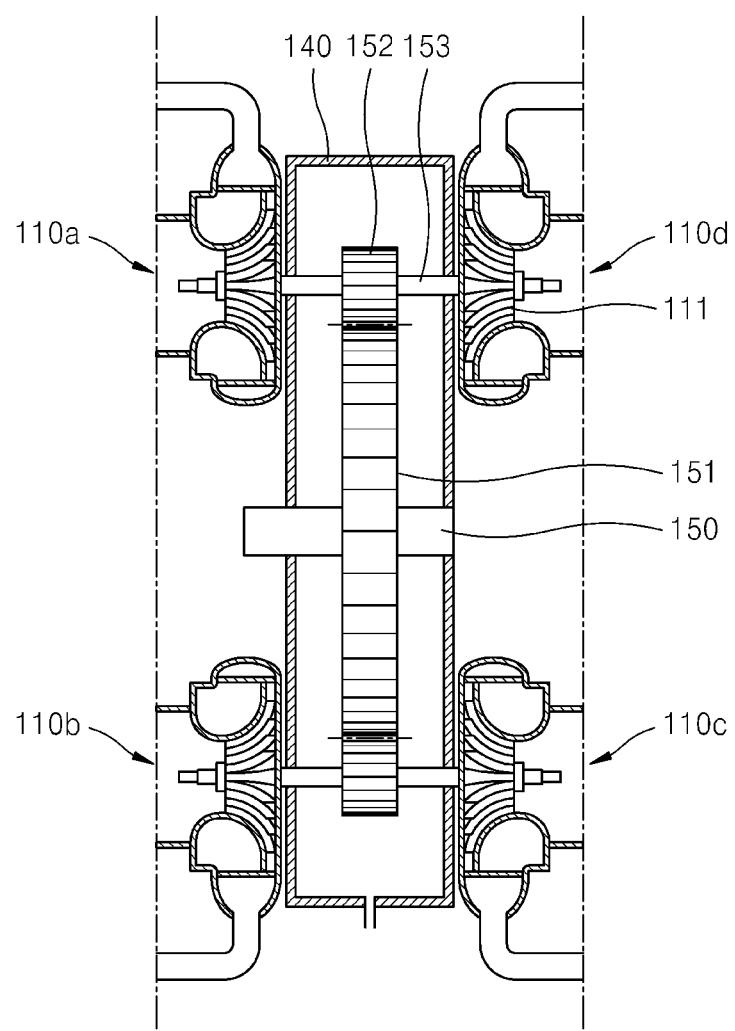
FIG. 3 is a top view of a transfer unit of the turbine system illustrated in FIG. 1, according to an exemplary embodiment.
Figure 4:
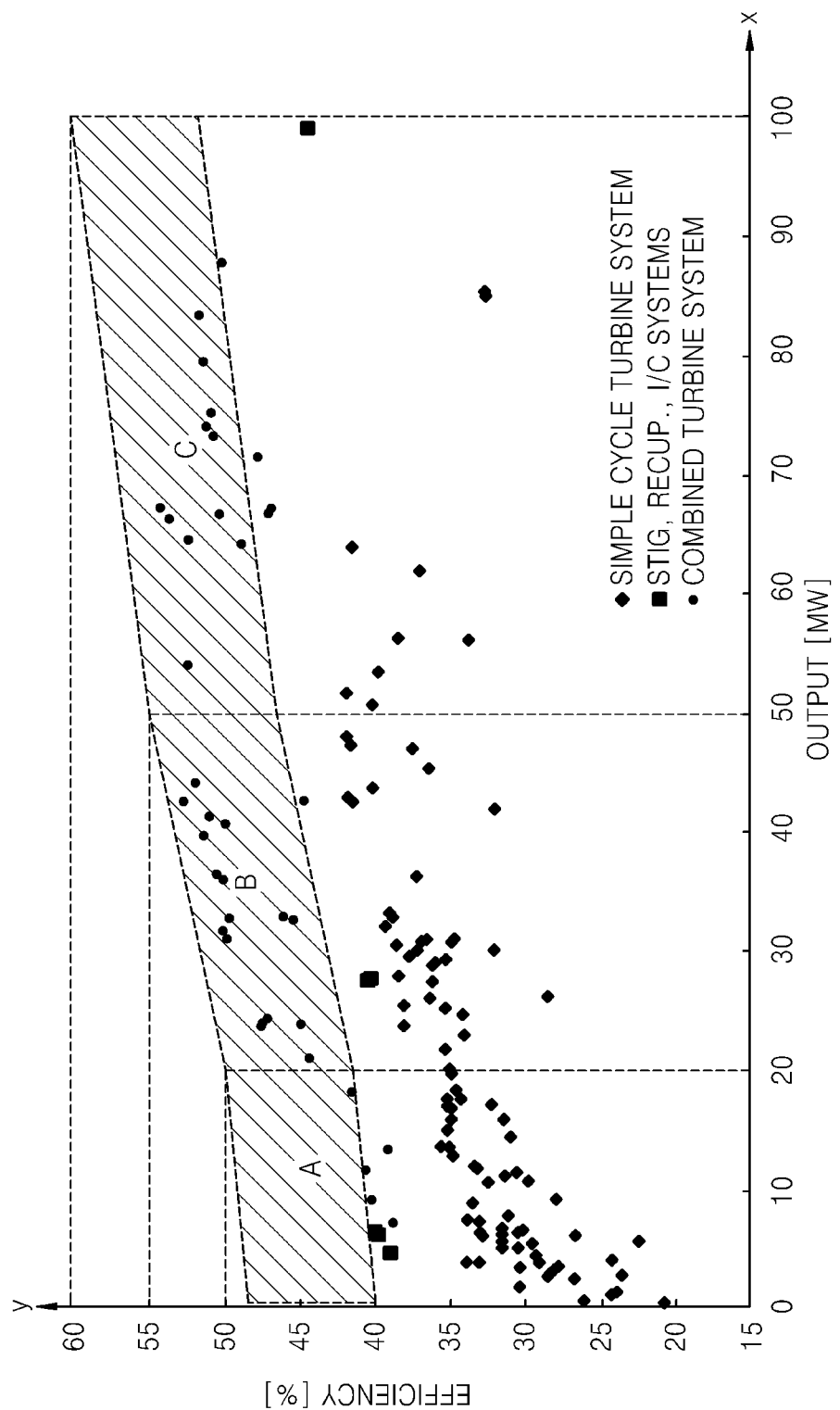
FIG. 4 is a graph showing correlations between an output and efficiency of the turbine system illustrated in FIG. 1 in comparison to other systems, according to an exemplary embodiment.

A turbine system according to an exemplary embodiment will now be described with reference to FIGS. 1 through 4. FIG. 1 is a schematic structural view of a turbine system 1 according to an exemplary embodiment. FIG. 2 is a schematic perspective view of the turbine system 1 illustrated in FIG. 1, according to an exemplary embodiment. FIG. 3 is a top view of a transfer unit 140 of the turbine system 1 illustrated in FIG. 1, according to an exemplary embodiment. FIG. 4 is a graph showing correlations between an output and efficiency of the turbine system 1 illustrated in FIG. 1 in comparison to other systems, according to an exemplary embodiment.

Referring to FIG. 1, the turbine system 1 may include compressor units 110a-110d, intercoolers 120a-120c, a humidifier 130, a combustor unit 210, a turbine unit 220, a first device 230 and a recuperator 240. In the present exemplary embodiment, four (4) compressor units 110a-110d are provided as illustrated in FIG. 1. However, the number of compressor units 110 may be more or less than four (4). Also in the present exemplary embodiments as illustrated in FIG. 1, three (3) intercoolers 120a-120c are provided. However, the number of intercoolers 120 may be more or less than three. For example, FIG. 2 shows that the turbine system 1 may include one compressor unit 110 and one intercooler 120.

Referring to FIGS. 1 and 3, the compressor units 110a-110d may compress a provided fluid I. Each of the compressor units 110a-110d may include an impeller 111 as shown in FIG. 3, and may accelerate the fluid I due to rotation of the impeller 111. In this case, the fluid I may be ambient air. The fluid I is not limited thereto and may be an exhaust gas or any other type of various fluids.

Pressure of the fluid I is increased while passing through a plurality of compressor units 110a-110d. For example, the fluid I compressed by the compressor unit 110a absorbs heat generated during compression, and thus, requires more energy when compressed by the following compressor stage in the compressor unit 110b, 110c or 110d. Accordingly, the intercooler 120a, 120b or 120c is disposed between every two consecutive compressor units, respectively, to cool the fluid I from heat generated by compression and provide the cooled fluid I to a subsequent compressor unit, and thus, the energy required by the compressor units may be reduced. For example, the load of a motor for generating rotary power required for compression or a rotational shaft for transferring the rotatory power to an external device may be reduced. The intercoolers 120a-120c may cool down the fluid I by means of an air-cooling method or a water-cooling method. A refrigerant of the intercoolers 120a-120c is not limited to water or the like, and various refrigerants may be used.

The humidifier 130 may add moisture to the fluid I compressed by the compressor units 110a-110d to provide the fluid I to the recuperator 240. The humidifier 130 may increase at least one of the amount of water vapour, relative humidity and absolute humidity of the fluid I by adding moisture to the fluid I. If, however, the turbine system 1 stops or has a change in load, the fluid I may be directly provided to the recuperator 240 without passing through the humidifier 130. If moisture is added to the compressed fluid I, it may improve the heat transfer efficiency of the recuperator 240, and an output and efficiency of the recuperator 240 may be improved due to the increase in mass.

The combustor unit 210 burns fuel and the fluid I compressed by the compressor units 110 to generate a combustion gas. The combustion gas of the combustor unit 210 rotates a turbine (not illustrated) of turbine unit 220. The first device 230 may be any mechanical device that operates by using rotatory power received from the turbine unit 220. For example, the first device 230 may be a power generator that generates electricity by using rotatory power received from the turbine unit 220. The first device 230 may also be a general mechanical device or system such as a gas compressor, a cooling system or a water purifying system. Hereinafter, the first device 230 is referred to as a power generator 230 for convenience of explanation.

The combustion gas generated by the combustor unit 210 may rotate the turbine of the turbine unit 220, and the rotatory power of the turbine may be transferred to the power generator 230 to generate electricity. In this case, the power generator 230 may function as at least one of a power generator and a motor.

Figure 7:
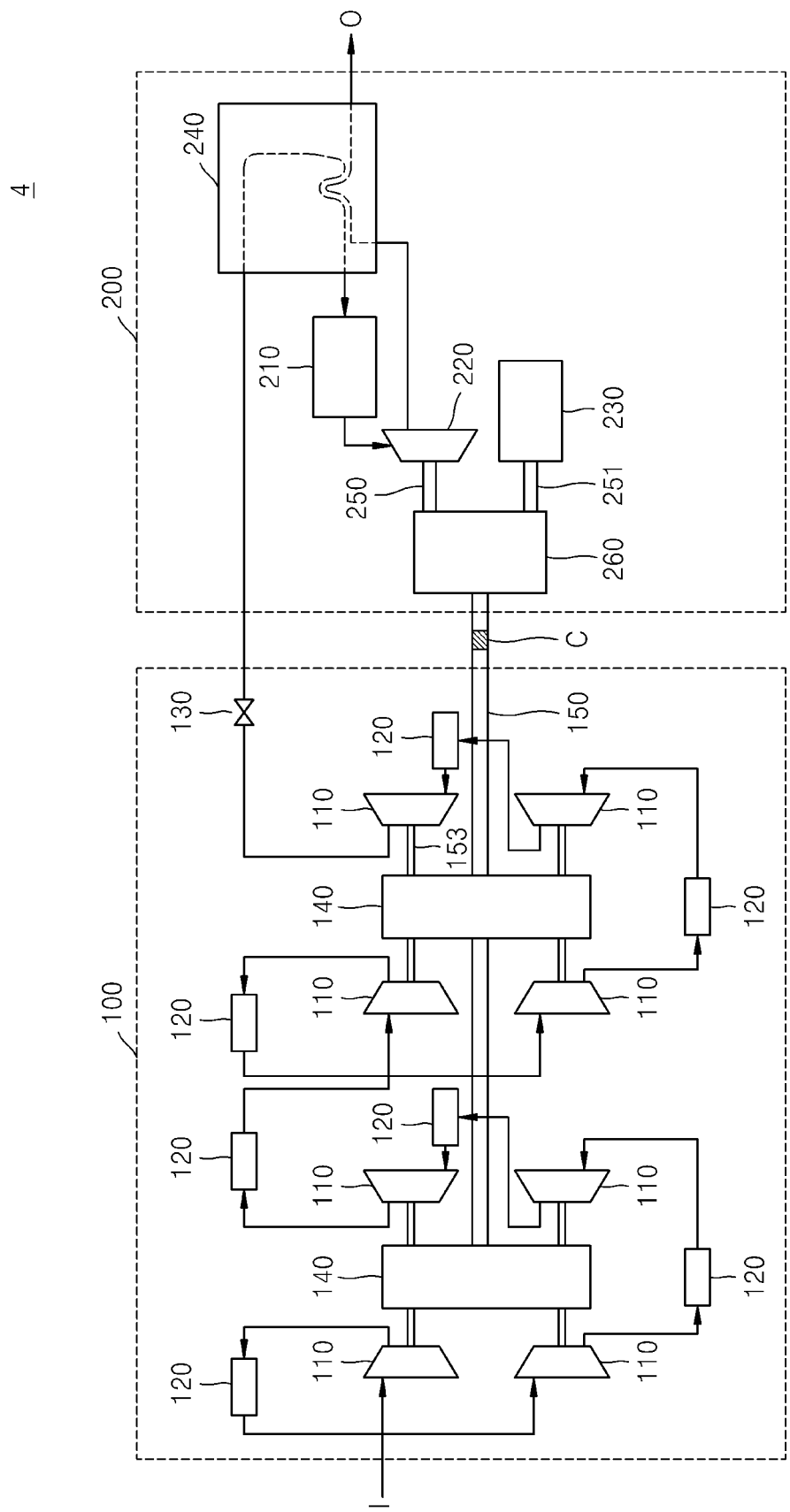
FIG. 7 is a schematic structural view of a turbine system according to another exemplary embodiment.

Although the power generator 230 is disposed between the compressor units 110a-110d and the turbine unit 220 in FIG. 1, the position of the power generator 230 is not limited thereto. Although not shown in FIG. 1, for example, the turbine unit 220 may be disposed between the compressor units 110a-110d and the power generator 230. That is, the compressor units 110a-110d, the turbine unit 220 and the power generator 230 may be sequentially disposed and, in this case, a transmission unit 260 (as shown in FIG. 7) may be disposed between the power generator 230 and the turbine unit 220 to change a rotation speed of the rotatory power of the turbine unit 220 and provide the rotatory power to the power generator 230. The transmission unit 260 with reference to FIG. 7 will be described later.

The recuperator 240 may perform as a heat exchanger between an exhaust gas discharged from the turbine unit 220 and the fluid I passed through the humidifier 130. The recuperator 240 may include, for example, a plurality of tubes such that heat exchange may occur via walls of the tubes as the exhaust gas contacts outer surfaces of the tubes and the compressed fluid passes through the tubes. As such, the temperature of the exhaust gas may be decreased and the temperature of the compressed fluid may be increased. The recuperator 240 may heat the fluid I directly provided from the compressor units 110 without passing through the humidifier 130. The recuperator 240 may also heat the fluid I provided from the compressor units 110 through the humidifier 130. The recuperator 240 recuperates the amount of heat emitted from the turbine unit 220 by transferring the amount of heat in the exhaust gas of the turbine unit 220 to the humidified fluid I, and thus, the required amount of fuel in the combustor 210 to generate hot gas is reduced and the efficiency of turbine system 1 is enhanced. The recuperator 240 may be of various types such as a channel type, a radiation type or a flue tube type according to a condition of a discharge gas, an installation location or a purpose of use, but is not limited thereto.

The turbine system 1 may not include at least one of the humidifier 130, the intercoolers 120a-120c, the recuperator 240 or the power generator 230. For example, if the humidifier 130 and the recuperator 240 are not included, the turbine system 1 may include only at least one of the compressor units 110a-110d, at least one of the intercoolers 120a-120c, the combustor unit 210, the turbine unit 220 and the power generator 230.

The efficiency of the turbine system 1 will now be described with reference to FIG. 4. FIG. 4 shows distributions of overall efficiencies according to outputs in a simple cycle turbine system (♦), steam injected gas turbine (STIG), recuperator (Recup.), and intercooler (I/C) systems (■) and a combined cycle turbine system (●). In FIG. 4, ♦, ■ and ● respectively represent overall efficiency values according to outputs in the simple cycle turbine system (♦), the STIG, Recup., and I/C systems (■) and combined cycle turbine system (●).

In this case, the simple cycle turbine system (♦) may include the compressor units 110a-110d, the combustor unit 210, the turbine unit 220 and the power generator 230. The STIG system (■) may further include the humidifier 130 in addition to the elements of the simple cycle turbine system (♦). The Recup. system (■) may further include the recuperator 240 in addition to the elements of the simple cycle turbine system (♦). The I/C system (■) may further include the intercoolers 120 in addition to the elements of the simple turbine cycle system (♦). The combined cycle turbine system (●) may further include a heat recovery steam generator (HRSG) and a steam turbine device in addition to the elements of the simple cycle turbine system (♦).

In a range where the output of the power generator 230 is, for example, about 0 MW to about 20 MW, the outputs of the simple cycle turbine system (♦), the STIG, Recup., and I/C systems (■) and the combined cycle turbine system (●) are not greater than about 40%. The power required to compress the fluid I by the compressor units 110a-110d needs to be reduced to improve the efficiency of the turbine system 1, and at least one of the intercoolers 120a-120c may be used to reduce the power. However, if the compressor units 110a-110d, the combustor unit 210 and the turbine unit 220 are disposed in a single housing, an overall volume of a system may be reduced but a sufficient number of intercoolers may not be included due to a spatial restriction. Also, if the size of the single housing is simply increased, the length of a rotational shaft for coupling the compressor units 110a-110d, the turbine unit 220 and the power generator 230 is increased. In this case, as the length of the rotational shaft that rotates at high speed is increased, a problem may occur in, for example, the torsional strength of the rotational shaft, and vibration due to rotordynamic characteristics. In more details, since one end of the rotational shaft, i.e., the turbine unit 220, rotates at high speed due to an explosive combustion gas generated by the combustor unit 210 while the other end of the rotational shaft transfers the rotary power of the one end of the rotational shaft and rotates the power generator 230 and the compressor units 110, a torque is applied between the two ends of the rotational shaft. Because the torque is applied to the two ends of the rotational shaft, the one end of the rotational shaft is twisted by a certain angle with respect to the other end of the rotational shaft. The angle by which the two ends are twisted is referred to as an angle of twist. In this case, as the amount of torque is increased and the length of the rotational shaft is increased, the angle of twist is also increased. Accordingly, if an angle of twist of a rotational shaft is considered to design the rotational shaft, the length of the rotational shaft is restricted. In more detail, when the compressor units 110a-110d, the turbine unit 220 and the power generator 230 are coupled by using a single rotational shaft, the length of the rotational shaft is restricted due to a torsional strength and/or rotordynamic characteristics, and thus, the turbine system 1 has a spatial restriction. Accordingly, a restriction may occur such that, for example, a sufficient number of intercoolers may not be included between the compressor units 110a-110d.

In the turbine system 1, the compressor units 110a-110d may be disposed separately from at least one of the turbine unit 220 and the power generator 230. As such, a space for disposing a sufficient number of intercoolers, for example, the intercoolers 120a-120c, for the compressor units 110a-110d may be ensured. Also, in the turbine system 1, a plurality of shafts may be coupled by means of, for example, such as gears. As illustrated in FIG. 1, a first rotational shaft 150 may be coupled to a plurality of third rotational shafts 153 via the transfer unit 140. In this case, the transfer unit 140 may have various coupling structures such as a gear-coupling structure. For example, as illustrated in FIG. 3, a first gear 151 on the first rotational shaft 150 and the impellers 111 of the compressor units 110a-110d may be gear-coupled. In this case, the impellers 111 of the compressor units 110 may be coupled to the third rotational shafts 153, and second gears 152 on the third rotational shafts 153 may be gear-coupled to the first gear 151 on the first rotational shaft 150. The rotation speed of the impellers 111 may be increased or reduced according to a gear ratio between the first gear 151 and the second gears 152. Since the first rotational shaft 150 and the third rotational shafts 153 are not formed as a coaxial shaft, the length of the first rotational shaft 150 may be spatially reduced. Also, a plurality of the impellers 111 may be coupled to the first rotational shaft 150 simultaneously.

With reference to FIG. 1 again, the compressor units 110a-110d receive the rotatory power of the first rotational shaft 150 via the transfer unit 140. The first compressor unit 110a may receive and compress a provided fluid I. The compressed fluid I is cooled by the first intercooler 120a, and then, the cooled fluid I is provided to the second compressor unit 110b. The fluid I compressed by the second compressor unit 110b is cooled by the second intercooler 120b. The fluid I compressed by the third compressor unit 110c is cooled by the third intercooler 120c. The fluid I compressed by the fourth compressor unit 110d flows toward the humidifier 130. As discussed above, the number and arrangement of the compressor units and the intercoolers are not limited to those as shown in FIG. 1, and may be variously changed by one of ordinary skill in the art. The turbine system 1 may include at least two or three intercoolers. As such, the efficiency of the turbine system 1 may be improved. Although two or more intercoolers may not be easily included due to a restriction in size of first and second rotational shafts 150 and 250, and the turbine system 1, if a sufficient space is ensured by separating the compressor units 110a-110d from at least one of the power generator 230 and the turbine unit 220 as described above, a sufficient number of intercoolers 120 may be included. Also, if the compressor units 110a-110d and the first rotational shaft 150 are gear-coupled via the transfer unit 140, the length of the first rotational shaft 150 may be reduced, and thus, a problem of a vulnerable torsional strength of the first and second rotational shafts 150 and 250 due to the increase in length of the first and second rotational shafts 150 and 250 may be solved.

Here, the first and second rotational shafts 150 and 250 for coupling the compressor units 110a-110d, the power generator 230 and the turbine unit 220 may be detachably coupled. For example, the first and second rotational shafts 150 and 250 may be coupled by means of a first coupling member C. The first coupling member C may form axis coupling by means of, for example, a shaft coupling or a flange. As the first and second rotational shafts 150 and 250 are detachably coupled, the compressor units 110a-110d may be easily separated from the power generator 230 and the turbine unit 220. Also, if a twist occurs due to a difference in torque between the turbine unit 220 and the compressor units 110a-110d because the first and second rotational shafts 150 and 250 are coupled via the first coupling member C, the second rotational shaft 250 may be twisted with respect to the first rotational shaft 150 within a certain range, and thus, the difference in torque may be buffered. For example, the first and second rotational shafts 150 and 250 may be coupled by using a flange. In flange coupling, screw holes may be formed to penetrate the first and second rotational shafts 150 and 250 in a direction parallel to a shaft direction. An extra space may occur between each screw hole and a coupling member to be screw-coupled to the screw hole. If a difference in torque between the first and second rotational shafts 150 and 250 is large enough, then the difference in torque may be compensated for by rotating the second rotational shaft 250 with respect to the first rotational shaft 150 according to the amount of the extra space. Accordingly, a difference in torque may be buffered according to a coupling method of the first and second rotational shafts 150 and 250.

Alternatively, the first and second rotational shafts 150 and 250 may be integrally formed. In this case, the first coupling member C may not be used, and the first and second rotational shafts 150 and 250 may be detachably coupled to the transfer unit 140. For example, the first and second rotational shafts 150 and 250 may be integrally formed, and the integrally formed first and second rotational shafts 150 and 250 may be gear-coupled to the transfer unit 140.

As illustrated in FIG. 4, correlations between an output and an efficiency of the turbine system 1 are shown in regions A, B and C. The regions A, B and C, respectively, represent an output versus efficiency values of the turbine system 1 in ranges when the output of the power generator 230 is about 0 MW to about 20 MW, about 20 MW to about 50 MW, and about 50 MW to about 100 MW, respectively. For example, in the range about 0 MW to about 20 MW, the simple cycle turbine system (♦), the STIG, Recup., and I/C systems (■) and the combined cycle turbine system (●), i.e., existing systems, have overall efficiencies barely greater than about 40%, but the turbine system 1 has an efficiency about 40% to about 50%. This means that the efficiency of the turbine system 1 is greatly improved. For example, in the range about 50 MW to about 100 MW, the output versus efficiency values of the simple cycle turbine system (♦) and the STIG, Recup., and I/C systems (■) are not mostly included in the region C, but the output versus efficiency values of the turbine system 1 are included in the region C. That is, the efficiency of the turbine system 1 in the range where the output of the power generator 230 is about 50 MW to about 100 MW is about 50% to about 60%, which is greater than that of existing turbine systems. In this case, the range of the efficiency of the turbine system 1 in percentage (%) may be changed within a margin of error.

Accordingly, in the range where the output of the power generator 230 is about 0 MW to about 100 MW, the efficiency of the turbine system 1 is about 40% to about 60%. Also, in the range where the output of the power generator 230 is about 0 MW to about 50 MW, the efficiency of the turbine system 1 may be about 40% to about 55%. In particular, in the range where the output of the power generator 230 is about 0 MW to about 20 MW, the efficiency of the turbine system 1 may be about 40% to about 50%.

Also, when the output of the power generator 230 is not greater than about 50 MW, the efficiency of the turbine system 1 may be about 40% to about 55%. In particular, when the output of the power generator 230 is not greater than about 20 MW, the efficiency of the turbine system 1 may be about 40% to about 50%.

Accordingly, it is shown that the efficiency of the turbine system 1 is greatly improved. Factors for improving the efficiency of the turbine system 1 as described above may include, for example, a sufficient space for a plurality of intercoolers 120a-120c, which is ensured by separating the compressor units 110a-110d from the power generator 230 or the turbine unit 220, and a plurality of rotational shafts, i.e., the first through third rotational shafts 150, 250 and 153, which are gear-coupled to each other in order to reduce the length of the first and second rotational shafts 150 and 250 that cause a restriction in design.

Further, the turbine system 1 may include first and second housings 100 and 200 those are separated each other as shown in FIG. 1. The first housing 100 may accommodate the compressor units 110a-110d, and the second housing 200 may accommodate the combustor unit 210, the turbine unit 220 and the power generator 230. The first housing 100 may further accommodate the intercoolers 120a-120c. An aftercooler (not shown) may be further included. The second housing 200 may further accommodate the recuperator 240. The humidifier 130 may be included in the first housing 100 or the second housing 200, or may be disposed near an outlet of the first housing 100, through which the fluid I compressed by the compressor units 110 moves toward the second housing 200. As illustrated in FIG. 1 or 2, as the first and second housings 100 and 200 are separated, a space for a plurality of compressor units 110a-110d and a plurality of intercoolers 120a-120c may be ensured. In this case, at least one of the first and second housings 100 and 200 may not be formed. For example, the first housing 100 may not be formed, and the second housing 200 may accommodate at least a portion of the combustor unit 210, the turbine unit 220 and the power generator 230. In this case, the compressor units 110 may be separate from the second housing 200.

As such, the length of the first and second rotational shafts 150 and 250 may be further reduced, and a space for the compressor units 110a-110d and the intercoolers 120a-120c may be expanded while maintaining the rigidity of the first and second rotational shafts 150 and 250.

Also, as the first and second rotational shafts 150 and 250 are detachably coupled to each other, the compressor units 110a-110d may be easily separated from the power generator 230 or the turbine unit 220. The above-described effects may be achieved if the turbine system 1 is applied to equipments which are not spatially restrictive for installation or operation otherwise so, e.g., an aircraft or a vessel. Also, the turbine system 1 may include separated components as separate modules, and may be reconstructed in an easily movable form. For example, the components of the turbine system 1 may be disposed in a standardized space such as a container system. In this case, the turbine system 1 may be easily installed without any space restrictions. That is, the turbine system 1 may be separated into one or more components, and may be re-disposed on at least one base frame to be easily movable.

For example, at least one of the compressor units 110a-110d, the turbine unit 220, the power generator 230 and the combustor unit 210 may be disposed on at least one movable base frame. In this case, the movable turbine system 1 or the movable component may be moved by means of a moving device such as a trailer or by adding a moving device under the base frame.

Figure 5:
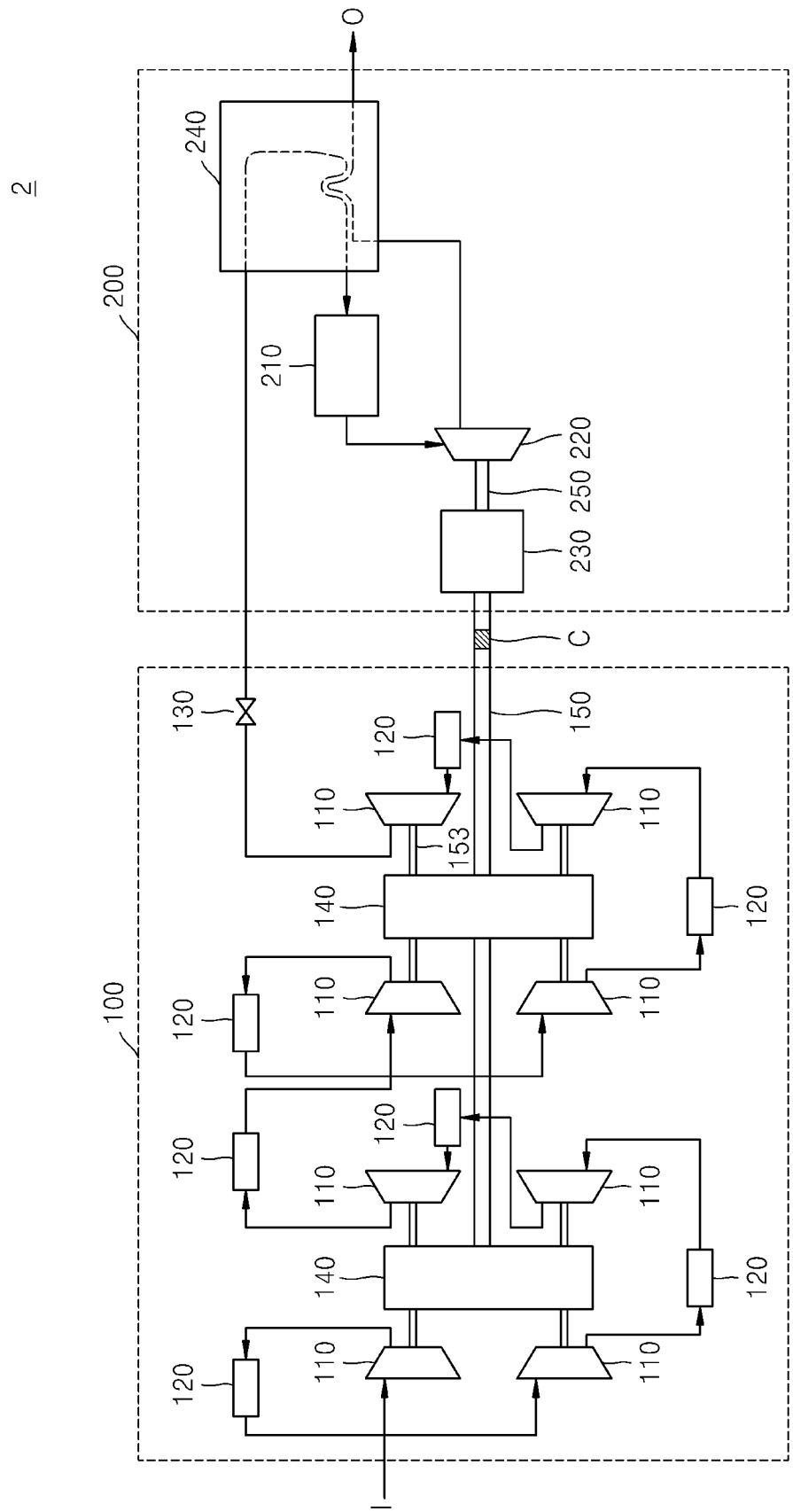
FIG. 5 is a schematic structural view of a turbine system according to another exemplary embodiment.

The first modified example of the turbine system 1 illustrated in FIG. 1 will now be described with reference to FIG. 5. FIG. 5 is a schematic structural view of a turbine system 2 according to another exemplary embodiment. Referring to FIG. 5, at least two compressor units 110 may be gear-coupled to a first rotational shaft 150. The number of compressor units 110 may be at least two or more. For example, a plurality of transfer units 140 may be formed on the first rotational shaft 150 in order to gear-couple the compressor units 110 to the first rotational shaft 150. The first rotational shaft 150 and the compressor units 110 may be gear-coupled via the transfer unit 140. As such, the length of first and second rotational shafts 150 and 250 may be reduced. In more detail, for example, if the compressor units 110 are directly coupled to a single rotational shaft, i.e., the first rotational shaft 150, instead of being gear-coupled to the first rotational shaft 150, the length of the first rotational shaft 150 has to be increased in order to be coupled to eight compressor units 110. Accordingly, as the compressor units 110 and the first rotational shaft 150 are gear-coupled to each other, the turbine system 2 may have a compact size. Also, the compressor units 110 may be separate from a turbine unit 220 or a power generator 230, and thus, a space for the compressor units 110 and intercoolers 120 coupled to the compressor units 110 may be ensured. As described above in relation to FIG. 1, the first and second rotational shafts 150 and 250 may be easily detachably coupled to each other by using a first coupling member C. A first housing 100 may accommodate at least the compressor units 110, and a second housing 200 may accommodate at least a combustor unit 210, the turbine unit 220 and the power generator 230. The first housing 100 may further accommodate the intercoolers 120, and the second housing 200 may further accommodate a recuperator 240.

Figure 6:
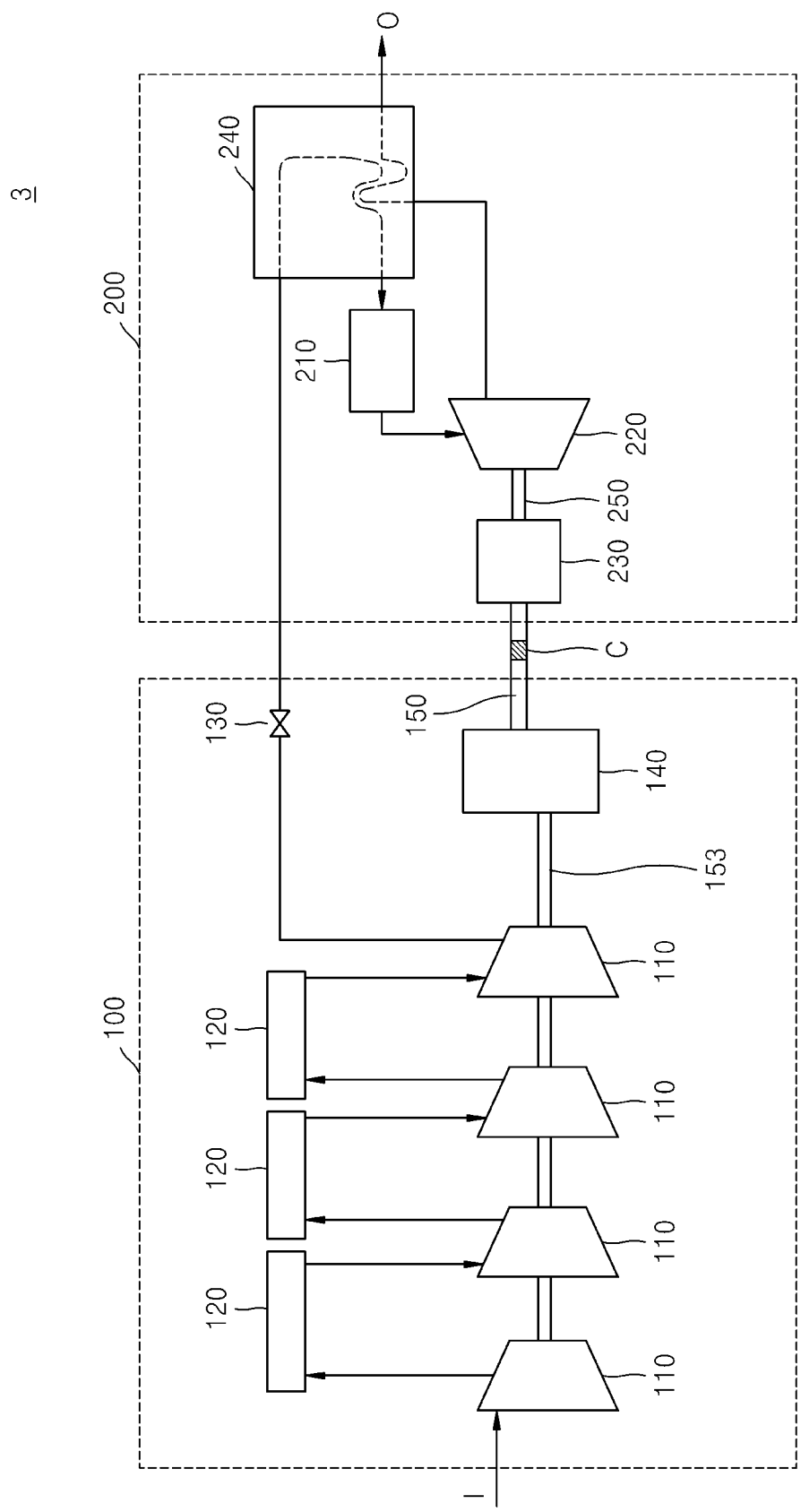
FIG. 6 is a schematic structural view of a turbine system according to another exemplary embodiment.

The second modified example of the turbine system 1 illustrated in FIG. 1 will now be described with reference to FIG. 6. FIG. 6 is a schematic structural view of a turbine system 3 according to another exemplary embodiment. Referring to FIG. 6, first and second rotational shafts 150 and 250 may be coupled by using a first coupling member C. In this case, the first and second rotational shafts 150 and 250 may be integrally formed without using the first coupling member C. Each of a plurality of compressor units 110 may include an impeller (not shown) that rotates about a third rotational shaft 153. At least three compressor units 110 may be shaft-coupled to the third rotational shaft 153. The first and third rotational shafts 150 and 153 may be gear-coupled to reduce the length of the first rotational shaft 150, and a rotation speed of the third rotational shaft 153 may be variously changed due to the gear-coupling. The turbine system 3 may include first and second housings 100 and 200 that are separate from each other. The first housing 100 may accommodate at least the compressor units 110, and the second housing 200 may accommodate at least a combustor unit 210, a turbine unit 220 and a power generator 230. In this case, the first housing 100 may further accommodate intercoolers 120, and the second housing 200 may further accommodate a recuperator 240. Also, at least one of the first and second housings 100 and 200 may not be formed.

The third modified example of the turbine system 1 illustrated in FIG. 1 will now be described with reference to FIG. 7. FIG. 7 is a schematic structural view of a turbine system 4 according to another exemplary embodiment. The turbine system 4 is similar to the turbine system 2 illustrated in FIG. 5, and thus, will be mainly described with respect to differences therebetween. In this case, like reference numerals denote like elements. Referring to FIG. 7, the turbine system 4 additionally includes a transmission unit 260. The transmission unit 260 may be shaft-coupled to compressor units 110, a turbine unit 220 and a power generator 230. In more detail, the transmission unit 260 may be coupled to the compressor units 110 via a first rotational shaft 150, may be coupled to the turbine unit 220 via a second rotational shaft 250, and may be coupled to the power generator 230 via a fourth rotational shaft 251. The transmission unit 260 may change rotation speeds of the second rotational shaft 250 that is an output shaft of the turbine unit 220, the fourth rotational shaft 251 that is an input shaft of the power generator 230, and the first rotational shaft 150 that is an input shaft of the compressor units 110. The first, second and fourth rotational shafts 150, 250 and 251 may not be disposed in a line. That is, as illustrated in FIG. 7, the transmission unit 260 may be coupled to the compressor units 110, the turbine unit 220 and the power generator 230 via independent shafts. The transmission unit 260 may shift gears by including, for example, one or more gears in order to improve the efficiency of the turbine system 4 by easily adjusting rotation speeds and torques of the first, second and fourth rotational shafts 150, 250 and 251. Since the transmission unit 260 rotates at a high speed, and the first, second and fourth rotational shafts 150, 250 and 251 having different torque values are not formed as a single shaft, the length of the first, second and fourth rotational shafts 150, 250 and 251 may be reduced. Accordingly, in the turbine system 4 including the transmission unit 260, a high stability may be maintained in spite of high-speed rotation of the first, second and fourth rotational shafts 150, 250 and 251, and the first, second and fourth rotational shafts 150, 250 and 251 may be easily designed and arranged. As illustrated in FIG. 7, the transmission unit 260 may be accommodated in a second housing 200. However, the location of the transmission unit 260 is not limited thereto. For example, the transmission unit 260 may be accommodated in the first housing 100, and may be coupled to the turbine unit 220 and the power generator 230 via the second and fourth rotational shafts 250 and 251. Alternatively, the transmission unit 260 may be disposed between the turbine unit 220 and the power generator 230 to change rotation speeds of an output shaft of the turbine unit 220 and an input shaft of the power generator 230.

As described above, according to the exemplary embodiments, the efficiency of a turbine system may be improved.

While the present inventive concept has been particularly shown and described with reference to the exemplary embodiments thereof, it will be understood by those of ordinary skill in the art that various changes in form and details may be made therein without departing from the spirit and scope of the present inventive concept as defined by the following claims.

What is claimed is:

1. A turbine system comprising:
  a first housing;
  a second housing;
  at least one compressor unit configured to compress a fluid;
  at least one intercooler configured to cool the fluid discharged from the at least one compressor unit;
  a combustor unit configured to burn fuel with the compressed fluid;

a turbine unit configured to be driven due to a combustion gas that is generated when the combustor unit burns the fuel;

a recuperator configured to heat the fluid compressed by the at least one compressor unit, by using at least an exhaust gas discharged from the turbine unit; and a first device configured to receive power that is generated when the turbine unit is driven, wherein the at least one compressor unit is configured to operate using at least the generated power, and is separately disposed from at least one of the turbine unit and the first device, wherein the first housing accommodates at least the at least one compressor unit and the at least one intercooler, wherein the second housing accommodates at least the combustor unit, the recuperator, and the first device, and wherein the first and second housings are separated by space in an extending direction of a first rotational shaft mechanically coupled to the at least one compressor unit.

2. The turbine system of claim 1, wherein the at least one compressor unit is configured to receive the generated power via gear-coupling.

3. The turbine system of claim 1, further comprising a second rotational shaft mechanically coupled to the turbine unit, wherein the first rotational shaft and the second rotational shaft are detachably coupled to each other.

4. The turbine system of claim 3, wherein the first rotational shaft and the second rotational shaft are coupled to each other by a first coupling member.

5. The turbine system of claim 3, wherein a number of the at least one compressor unit is two or more, and wherein at least two compressor units among the at least one compressor unit are gear-coupled to the first rotational shaft.

6. The turbine system of claim 3, wherein the first rotational shaft and the second rotational shaft are integrally formed to be gear-coupled to the compressor unit.

7. The turbine system of claim 3, wherein a number of the at least one compressor unit is two or more, and wherein at least two compressor units among the at least one compressor unit are shaft-coupled to the first rotational shaft.

8. The turbine system of claim 3, wherein the at least one compressor unit comprises an impeller that rotates about a third rotational shaft that is coupled to a first gear on the first rotational shaft and rotates according to a predetermined gear ratio.

9. The turbine system of claim 8, wherein a number of the at least one compressor unit is two or more, and wherein at least two compressor units among the at least one compressor unit are shaft-coupled to the third rotational shaft.

10. The turbine system of claim 1, wherein a number of the at least one intercooler is two or more.

11. The turbine system of claim 1, wherein the first device comprises a power generator that generates electricity.

12. The turbine system of claim 1, wherein the second housing accommodates the turbine unit.

13. The turbine system of claim 1, further comprising a humidifier configured to add moisture to the fluid compressed by the at least one compressor unit, to provide the fluid to the recuperator, wherein the first housing further accommodates the humidifier.

14. The turbine system of claim 1, wherein the turbine unit is disposed between the first device and the at least one compressor unit.

15. The turbine system of claim 1, further comprising a transmission configured to change rotation speeds of an output shaft of the turbine unit and an input shaft of the first device.

16. The turbine system of claim 1, wherein at least one of the at least one compressor unit, the turbine unit, the first device and the combustor unit is disposed on at least one base frame that is movable.

17. The turbine system of claim 1, further comprising a transmission configured to change rotation speeds of an output shaft of the turbine unit, an input shaft of the first device and an input shaft of the compressor unit, wherein the transmission is coupled to the compressor unit, the turbine unit and the first device via independent shafts.

18. The turbine system of claim 1, the first and second housings are separated by space in an extending direction of a first rotational shaft mechanically coupled between the at least on compressor unit of the first housing and the first device of the second housing.

* * * * *